United States Patent [19]

Rosenberg

[11] Patent Number: 4,967,499
[45] Date of Patent: Nov. 6, 1990

[54] PICTURE FRAME ASSEMBLY

[76] Inventor: Harry Rosenberg, 8941 Roosevelt Blvd., Philadelphia, Pa. 19152

[21] Appl. No.: 425,003

[22] Filed: Oct. 23, 1989

[51] Int. Cl.[5] .............................................. A47G 1/10
[52] U.S. Cl. ....................................... 40/152; 40/160; 403/402
[58] Field of Search ...................... 40/152, 152.1, 156, 40/157, 160; 403/381, 401, 402

[56] References Cited

U.S. PATENT DOCUMENTS

| | | | |
|---|---|---|---|
| 111,128 | 1/1871 | Linsuott | 403/401 |
| 497,915 | 5/1893 | Fulghum et al. | 403/402 |
| 1,463,150 | 7/1923 | Carlsen | 40/156 |
| 1,692,999 | 11/1928 | Siegel | 40/156 |
| 2,619,574 | 11/1952 | Lambert | 403/381 |
| 3,665,629 | 5/1972 | Shore | 40/156 |
| 3,745,680 | 7/1973 | Faust | 40/156 |
| 3,873,342 | 3/1975 | Ellison | 40/152 |
| 3,946,863 | 3/1976 | Glasband et al. | 40/152 |
| 4,170,080 | 10/1979 | Bergh et al. | 40/152 |
| 4,332,495 | 6/1982 | Bürgers | 403/402 |
| 4,493,583 | 1/1985 | Walhave | 403/402 |

FOREIGN PATENT DOCUMENTS

| | | | |
|---|---|---|---|
| 55415 | 5/1890 | Fed. Rep. of Germany | 40/152 |
| 2719434 | 11/1978 | Fed. Rep. of Germany | 403/402 |
| 153734 | 4/1932 | Switzerland | 403/401 |
| 1562320 | 3/1980 | United Kingdom | 40/152 |

Primary Examiner—Kenneth J. Dorner
Assistant Examiner—James M. Gardner

[57] ABSTRACT

A picture frame assembly which has an outer frame with an inner frame carried on the outer frame background plate with provisions for easy insertion and removal of image-carrying sheets, such as paintings, photographs and other decorative sheets. The picture frame is unique because of the following features. While the inner frame's bottom and side pieces are adhesively attached, the inner frame's top piece is detachably mounted to the inner frame's side pieces. The inner frame is extended further than the outer frame to allow image-carrying sheets to be inserted into the inner frame in a completely flat vertical orientation. The top piece is attached by the wedging of grooves in the each end of the top piece onto tapered corner connectors extending from the side pieces.

3 Claims, 3 Drawing Sheets

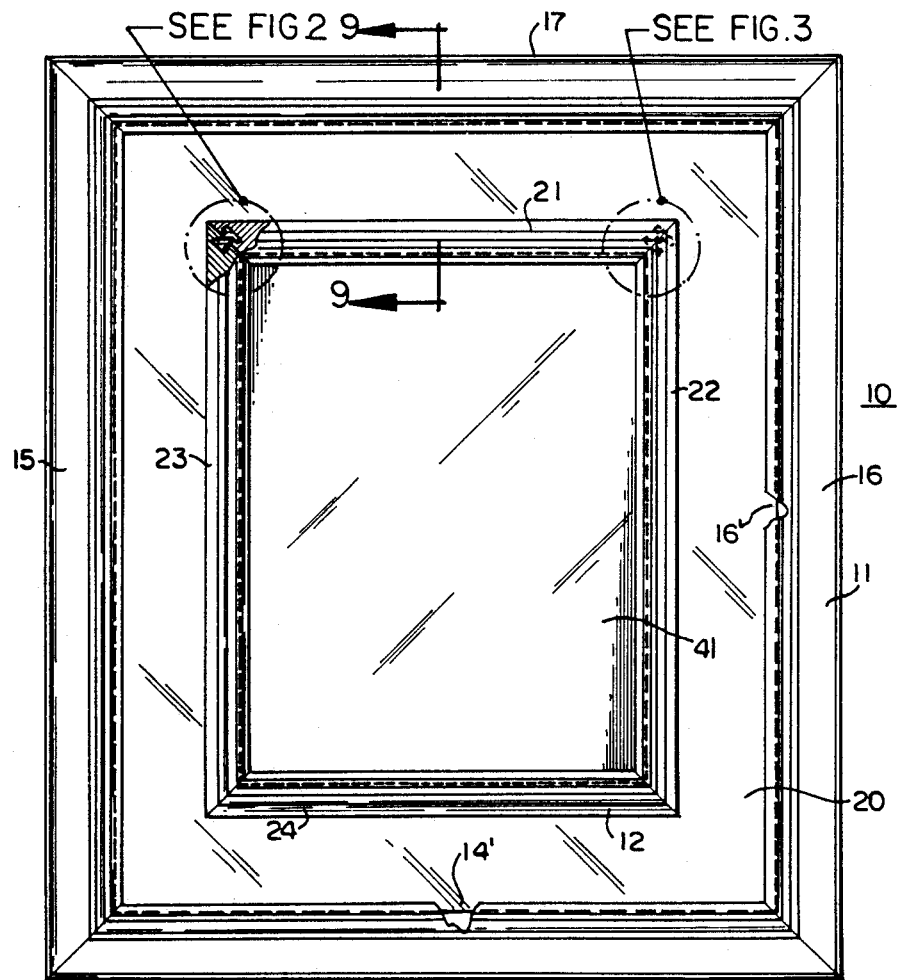
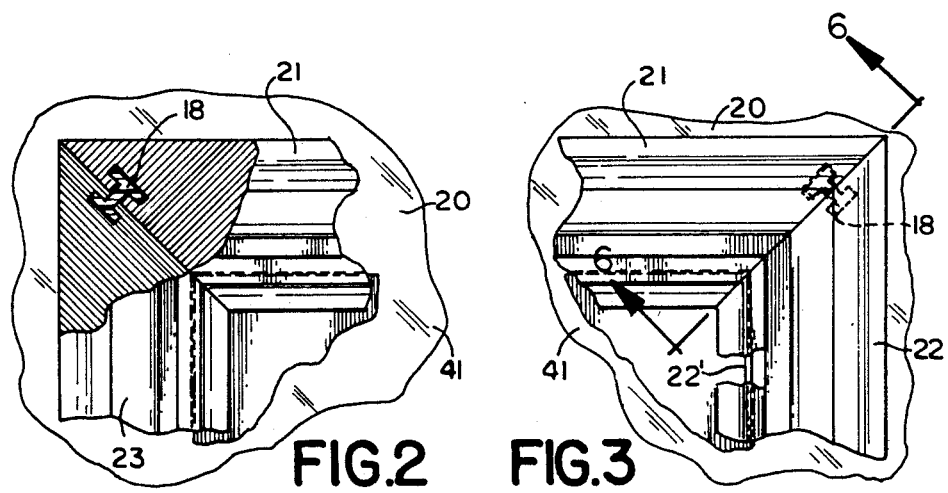
FIG. 1  FIG. 2  FIG. 3

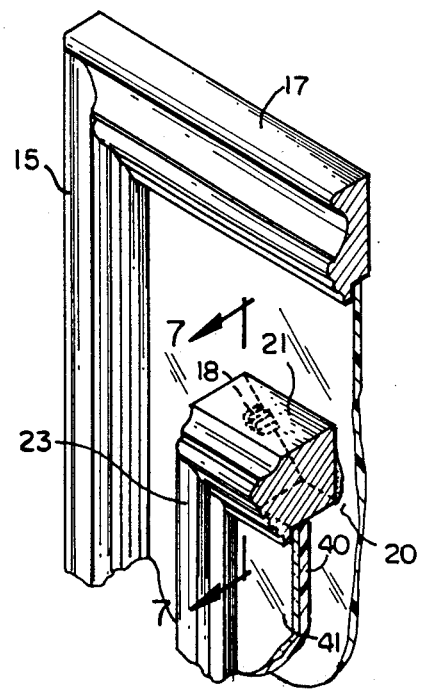
FIG. 4
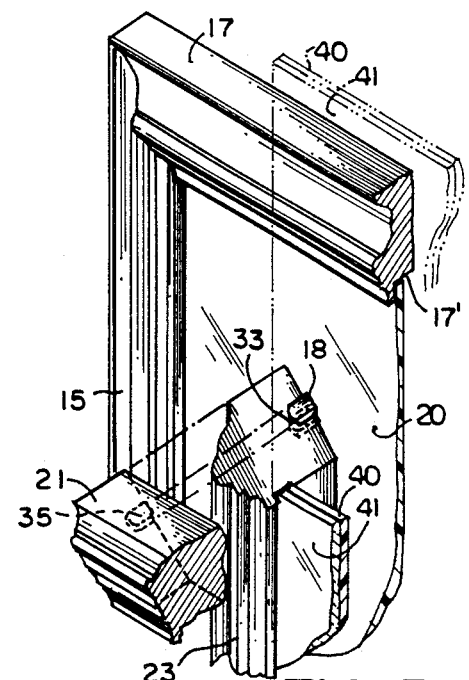
FIG. 5
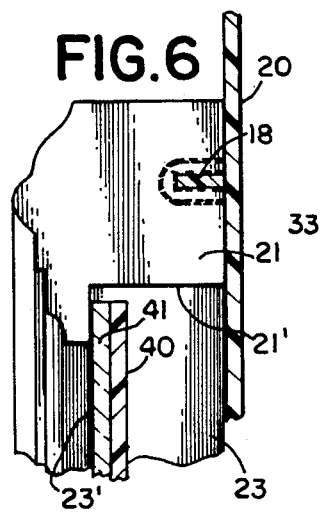
FIG. 6
FIG. 8
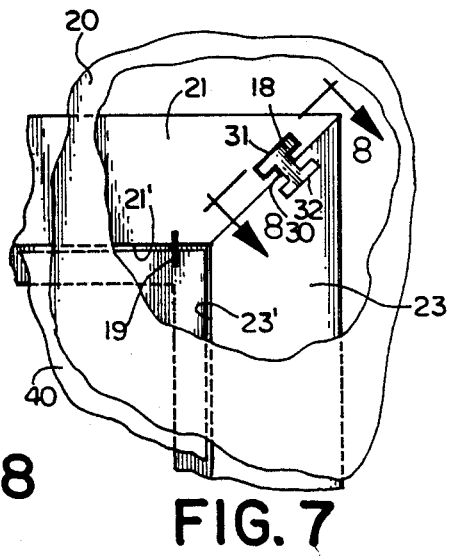
FIG. 7

PICTURE FRAME ASSEMBLY

BACKGROUND OF THE INVENTION

1. Field of the Invention

This invention relates to a two piece picture frame assembly of the frame within a frame type.

2. Description of the Prior Art

Two piece picture frame assemblies or frame within frame assemblies are known in the prior art.

Such assemblies consist of an outer frame mounting a piece of clear or colored glass to which an inner frame is permanently fastened. A dust cover is then permanently fastened to the back of the frame and can not be removed without destroying it. One of the purposes of such frame assemblies is to give prominence to the decorative image carrying sheets or pictures mounted in the inner frame. The concept also provides a border for the inner frame that can be clear, mirrored, or have a decorative mat placed behind the glass onto which the inner frame is mounted. Once the outer and inner frames are assembled it is very difficult to remove the mounted picture without complete disassembly of the frame, removal of the dust cover and consequent damage. Examples of prior art structures are illustrated in the U.S. Pat. to Shore, Nos. 3,665,629, Faust, 3,745,680, Ellison, 3,873,342, and Glasband et al., No. 3,946,863. While some of these structures mount photographs or other flat sheets, they are complicated, do not permit of easy assembly and disassembly, do not permit of variation of the background and suffer from other shortcomings. The picture frame assembly of the invention permits of easy assembly and disassembly of the inner frame to insert or replace the image carrying sheet without damage to the plate on which the inner frame is mounted, or to the outer frame.

SUMMARY OF THE INVENTION

The invention does not suffer from the discussed limitations and deficiencies of the prior art and provides a frame within a frame assembly which can carry a variety of image-carrying sheets, which can be easily replaced without disassembling or damaging the assembly or its components.

In accordance with the invention the picture frame assembly includes an outer frame, which mounts or carries a plate of glass or plastic to which an inner frame is mounted. The inner frame consists of four pieces of frame moulding, a top piece, two side pieces and a bottom piece. The side and bottom pieces are secured together and permanently attached to the plate. The top piece is detachably secured to the side pieces so that it can be removed without damaging the plate to permit image carrying sheets, and a cover, if desired, to be slid over the top or outer frame molding and inserted into the inner frame without damage to any portion of the assembly.

The principal object of the invention is to provide a picture assembly of the frame within frame type which has provisions for removal of a portion of the frame for insertion and removal of image carrying sheets, and/or protective covers for the sheets.

A further object of the invention is to provide a picture frame assembly of the character aforesaid which can accommodate a variety of image carrying sheets.

A further object of the invention is to provide a picture frame assembly of the character aforesaid which permits of easy variation of the effect achieved by the background plate carried by the outer frame assembly.

A further object of the invention is to provide a picture frame assembly of the character aforesaid which is simple and inexpensive to construct, and sturdy and long lasting in use.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a plan view of the picture frame assembly of the invention,

FIG. 2 is a fragmentary view, enlarged, and broken away showing the details of the attachment of the top left corner portion of the inner frame;

FIG. 3 is a fragmentary view, enlarged, showing the top right hand corner of the inner frame, which shows the attachment details;

FIG. 4 is a fragmentary view in perspective, and broken away to show the structure in assembled condition;

FIG. 5 is a view similar to FIG. 4 illustrating the structure with the top piece of the inner frame removed;

FIG. 6 is a vertical section view taken approximately on the line 6—6 of FIG. 3;

FIG. 7 is a vertical sectional view taken approximately on the line 7—7 of FIG. 4;

FIG. 8 is a vertical sectional view taken approximately on the line 8—8 of FIG. 7;

Figure 9:
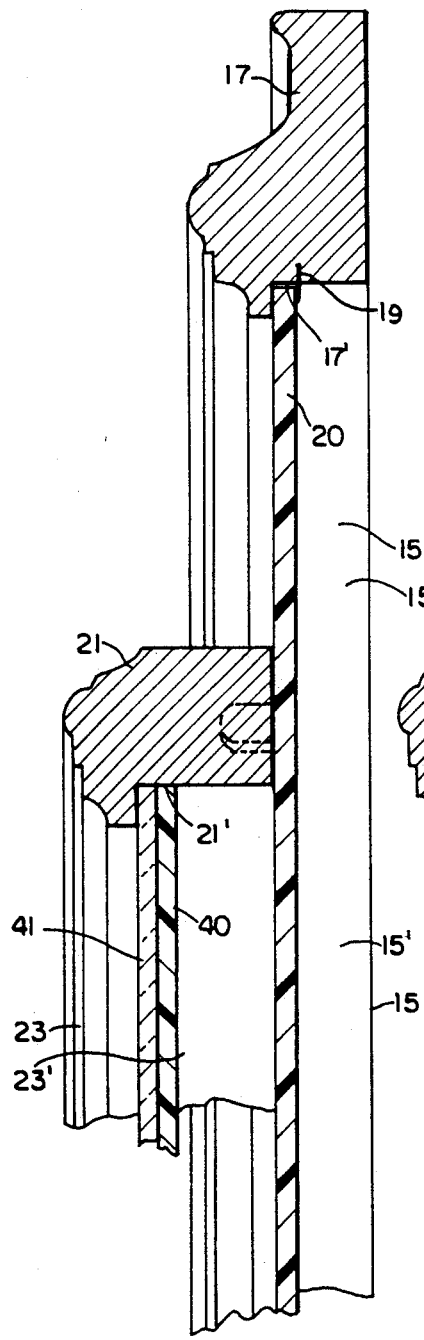
FIG. 9 is a vertical sectional view, enlarged, taken approximately on the line 9—9 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 10 thereof, the picture frame assembly 10 includes an outer frame 11 and an inner frame 12. The outer frame 11 as illustrated is of rectangular configuration with a bottom piece 14, side pieces 15, 16 and a top piece 17. The frame pieces 14, 15, 16, and 17 are formed of molding and can be of wood, metal, plastic or other suitable material as desired. The frame pieces 14, 15, 16 and 17 are each cut at a 45° angle at the corners, and can be secured together in any suitable manner such as by well known V nails (not shown). The frame pieces 14, 15, 16 and 17 are each provided with an inner perimeteral groove 14', 15', 16' and 17' which receives a plate 20, and which is retained therein by suitable well known fasteners such as brads 19. The plate 20 is illustrated of glass but can be of metal, wood, plastic or other materials and can be clear, colored or decorated as desired.

After assembly a dust cover (not shown) may be attached to the rear portions of the frame pieces 14, 15, 16 and 17 to prevent dust contamination of the plate 20.

The inner frame 12 as illustrated is of rectangular configuration with top piece 21, side pieces 22, 23 and bottom piece 24.

The inner frame pieces 21, 22, 23 and 24 as illustrated are of moulding which can be wood, plastic, metal or other suitable material as desired.

The bottom 24, and side pieces 22 and 23 are mitered at a 45° angle at the ends and secured together by V nails (not shown) at the corners. The bottom and side pieces after assembly are secured to plate 20 by any suitable means such as with small quantities of epoxy adhesive (not shown) of well known type. The side pieces 22, 23 at the top as seen in FIGS. 4–10 each have an H-shaped corner fastener 18 engaged therewith and with grooves 35 in the top piece 21 to be described. The fasteners 18 have a central rectangular portion 30 with plate portions 31 and 32 integral therewith and extending upwardly therefrom. The plate portions 31 and 32 have rounded tops 33 which taper outwardly toward the bottom to provide a wedging action when they are engaged in the grooves 35, which are in each end of piece 21, and are carried in the upper ends of side pieces 22, 23.

The inner frame pieces 21, 22, 23 and 24 each have an inner perimeteral groove 21', 22', 23' and 24' to receive the image-carrying sheets 40 to be described.

Figure 10:
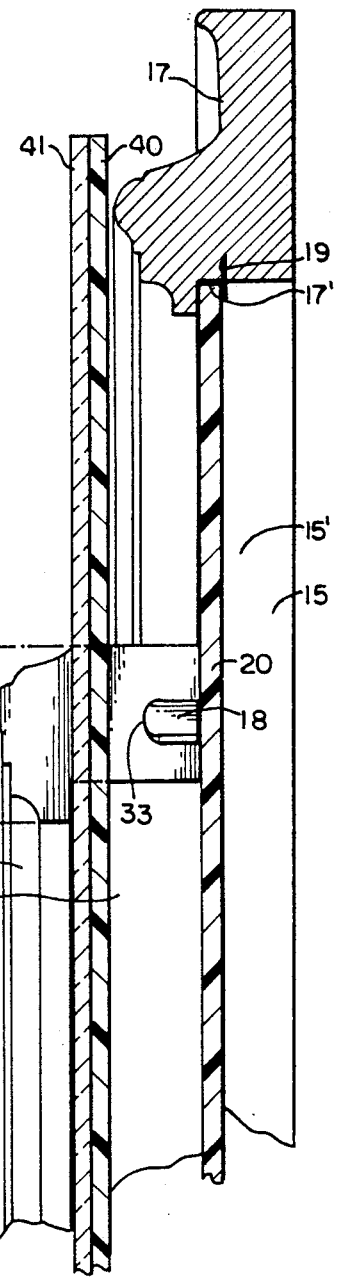
FIG. 10 is a view similar to FIG. 9, showing the manner of assembling an image carrying sheet into the inner frame.

The height of the grooves 22', 23' of the inner frame pieces 22, 23 in relation to the height of the outer frame piece 17 of the outer frame piece 17 must be such that there is sufficient clearance so that image carrying sheets and a cover can be slid over the frame piece 17 and into the grooves 22', 23' in a straight position as shown in FIG. 10 without damage to any portion of the assembly. It has been found that a minimum clearance of 5/16 inch between the top of outer frame piece 17 and the height of the grooves 21', 22', 23' and 24' is required, for the configuration illustrated.

The mode of use and operation will now be described.

With the outer frame 10 assembled as described, a plate 20 of the desired type and with the desired decoration is placed in grooves 14', 15', 16' and 17' and secured in well known manner such as by brads 19.

The bottom 24 and side pieces 22 and 23 of an inner frame 11 are assembled and fastened to plate 20 as described above. The image-carrying sheet 40 can then be easily inserted over outer frame piece 17 into grooves 22', 23' and slid down until it goes into groove 24' in the inner frame bottom piece 24. The top inner frame piece 21 is placed over the plate portions 31 of fasteners 18 carried by the side pieces 22 and 23 with engagement in the grooves 35 of top piece 21 and is pressed down until it contacts plate 20.

The top piece 21 can, if desired, have a portion of epoxy adhesive placed thereon (not shown) for permanent securement to plate 20 as desired.

A cover sheet 41 which can be of glass, plastic or decorative material can also be inserted into grooves 22', 23' and 24' prior to assembly of the top piece 21 and additional backing of filler material (not shown) can also be provided to cushion the sheet 40 without harm to the sheet 40 or the other portions of the assembly.

If the top piece 21 is not adhesively secured to plate 20, then the image carrying sheet 40 can be readily removed and replaced by lifting top piece 21 from plate 20, which can be done without scratching or marring plate 20 as nothing touches plate 20 between the top piece 21 and top outer frame piece 17.

It will thus be seen that structure has been provided with which the objects of the invention are achieved.

I claim:

1. A picture frame assembly comprising: an outer frame having ornamention forwardly projecting therefrom and defining a first plane at the free edge thereof and a rear recess which receives a backing plate, said backing plate having a front face defining a second plane parallel to said first plane, the distance between said first and second planes defining a first distance; an inner frame carried on said front face of said backing plate; said inner frame having bottom and side pieces fixedly fastened together at corners thereof and adhesively secured to said front face to said backing plate, said bottom and side pieces having perimeteral grooves to receive image-carrying sheets, said perimeteral grooves lying in a third plane positioned forwardly of said first and second planes; said third plane being spaced from said second plane and defining a second distance, said second distance is at least as great as said first distance; said side pieces have corner connectors engaged therewith only at the end opposite to said bottom piece; said inner frame having a top piece which is detachably mounted to said side pieces by complimentary grooves in each end which engage with said corner connectors, said corner connectors have rounded tops which taper outwardly towards said plate, said top piece is engaged with said corner connectors and pressed towards said plate for assembly and retention by the wedging of said rounded tops in said grooves.

2. A picture frame assembly as defined in claim 1 in which said outer frame and said inner frame are of material selected from the group consisting of wood, metal, and plastic.

3. A picture frame assembly as defined in claim 1 in which said backing plate is of material selected form the group consisting of glass, metal, and wood.

* * * * *